Dec. 11, 1956 W. W. PHARIS 2,773,938

TRUNK CIRCUIT

Filed April 1. 1955 4 Sheets-Sheet 1

INVENTOR.
WILLIAM W. PHARIS

BY J. Warren [signature]
ATTORNEY

Dec. 11, 1956 W. W. PHARIS 2,773,938

TRUNK CIRCUIT

Filed April 1. 1955 4 Sheets-Sheet 4

United States Patent Office 2,773,938 Patented Dec. 11, 1956

2,773,938

TRUNK CIRCUIT

William W. Pharis, Rochester, N. Y., assignor, by mesne assignments, to General Dynamics Corporation, a corporation of Delaware Application April 1, 1955, Serial No. 498,587

3 Claims. (Cl. 179—18)

This invention relates to trunk circuits for use in an automatic telephone system, and more particularly to conversation timing in such trunk circuits.

In the art of automatic telephony, means is provided so that a calling subscriber may dial to set a plurality of automatic switches and thereby seize and signal a called subscriber. On occasions, an automatic telephone system may be arranged so that the conversations are timed to cut-off communication after a predetermined time interval has passed. This introduces problems since it might be possible under some circumstances to have one subscriber station remain in a calling or called condition after the busy marking has been removed from the equipment involved. In this case it might be possible to have a second call seize the equipment before the first call is terminated thereby falsely interconnecting two subscriber stations. To forestall this faulty operation, it is desirable to provide means for preventing further conversation without releasing the automatic switch train. This means that a busy marking is maintained until both subscribers have hung-up while conversation is prevented after the elapse of a predetermined time period.

A first object of this invention is to provide new and improved conversation timing in a trunk circuit.

Another object of this invention is to provide means for breaking conversation after a predetermined time interval without releasing the automatic switch trains.

One way of accomplishing these and other objects is by means of a trunk circuit which is provided with bridge and supervisory relays adapted to hold the automatic switch trains on either side of the trunk circuit. Means is provided for interrupting the talking path between the effective circuit connections of these two relays so that each end is held independently of the continuity of the talking circuit between the points at which the two relays are connected.

It is thought that these and other objects will be obvious from a description of the attached drawings in which:

Fig. 1 shows by block diagram a telephone system of the type adapted to use this invention;

Figs. 2–4, when properly joined, show details of trunk circuit 116 which is enclosed in a heavily inked rectangle in Fig. 1;

Fig. 5 shows a timing chart designed to illustrate the manner in which interrupter 119 controls trunk circuit 116; and Fig. 6 shows the manner in which Figs. 2–4 should be joined to provide a complete and understandable circuit.

The drawings show the office battery by simple plus (+) and minus (−) signs. As in the case in most telephone systems, the positive terminal of the battery is described as being connected with ground; therefore, the terms "(−) battery" and "ground (+)" have been used throughout the specification. It should be understood that either this or any other suitable arangement may be used. Each stage of the automatic switch train includes a more-or-less conventional electromechanical switching device which may be of any suitable design. These switching devices are shown generally in Fig. 1 by a set of wipers and associated bank contacts, as at SW–1 for example.

*Brief description*

Briefly, conversation timing is provided by the operation of conversation timing relays 320 and 330 which operate under the influence of pulses transmitted from interrupter 119 to trunk circuit 116 over cable 118. When these relays have operated through a given cycle, a circuit is completed by them to restore release delay relay 340. Upon restoration of this relay the talking conductors are broken at contacts 241 and 242 so that conversation may not be continued after that time. The preceding switch train continues to be held in its operated condition due to the fact that calling bridge relay 430 is connected through contacts 411—414 to a point on conductors T and R which precedes the broken circuit at contacts 241 and 242, while the succeeding equipment is held by means of retard relay 260 and supervisory relay 410, both of which are connected to conductors T2 and R2 at a point following the broken talking conductors.

Referring now more specifically to the telephone systems as it is shown in Fig. 1, there is shown the calling subscriber station A who may call either subscriber station B or subscriber station D. To call subscriber station B, the subscriber at station A removes his receiver thereby causing finder 110 and selector 112 to cooperate under the influence of allotter 113 to extend subscriber A's line in accordance with the digit pulses transmitted from calling station A. If these digit pulses are of a value such that selector 112 is directed to seize connector 114, a second train of digit pulses may be utilized to set connector 114 and thereby seize and signal subscriber B's line. On the other hand, if the first digit pulse train to be transmitted from subscriber station A causes selector 112 to seize outgoing trunk line 115 and two-way trunk circuit 116, the next digit pulse to be transmitted from subscriber station A may be effective to set incoming selector 122 and connector 126 thereby to seize and signal the line which leads to subscriber D's location. In this call to subscriber D, an interrupter 119 operates to control relays in two-way trunk circuit 116. These relays proceed to operate through a cycle until a point is reached when warning tone is returned to the two conversing subscribers thereby informing them that they must terminate their conversation. After another short period of time, a warning tone is given a second time and then the speaking circuit is opened to block further conversation without releasing finder 110, selector 112, incoming selector 122 and connector 126, all of which remain in their operated condition until one of the associated subscribers, i. e., either the calling or the called subscriber, as the case may be, restores his telephone to its on-hook condition.

*Detailed description*

Figure 2:
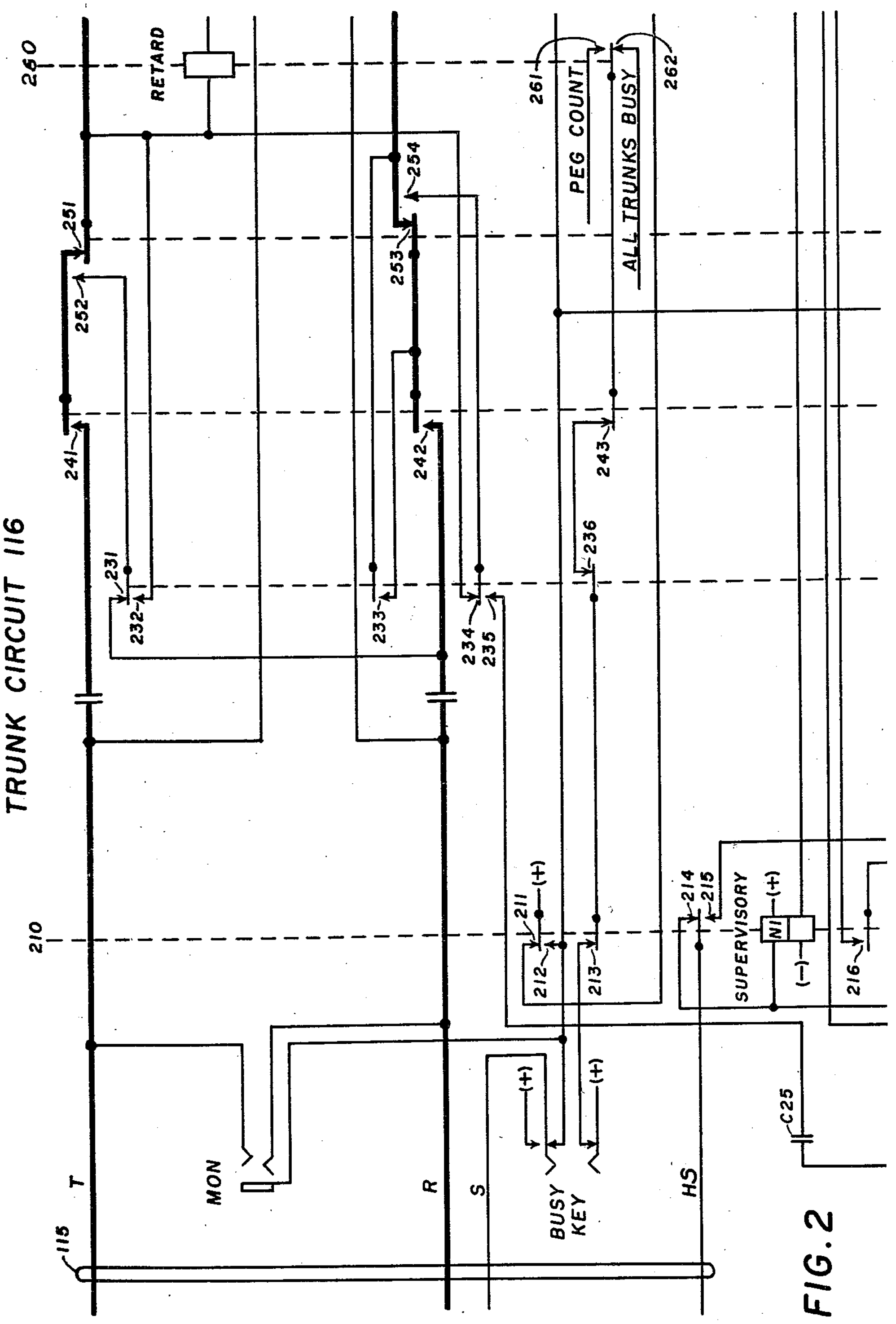
Figure 3:
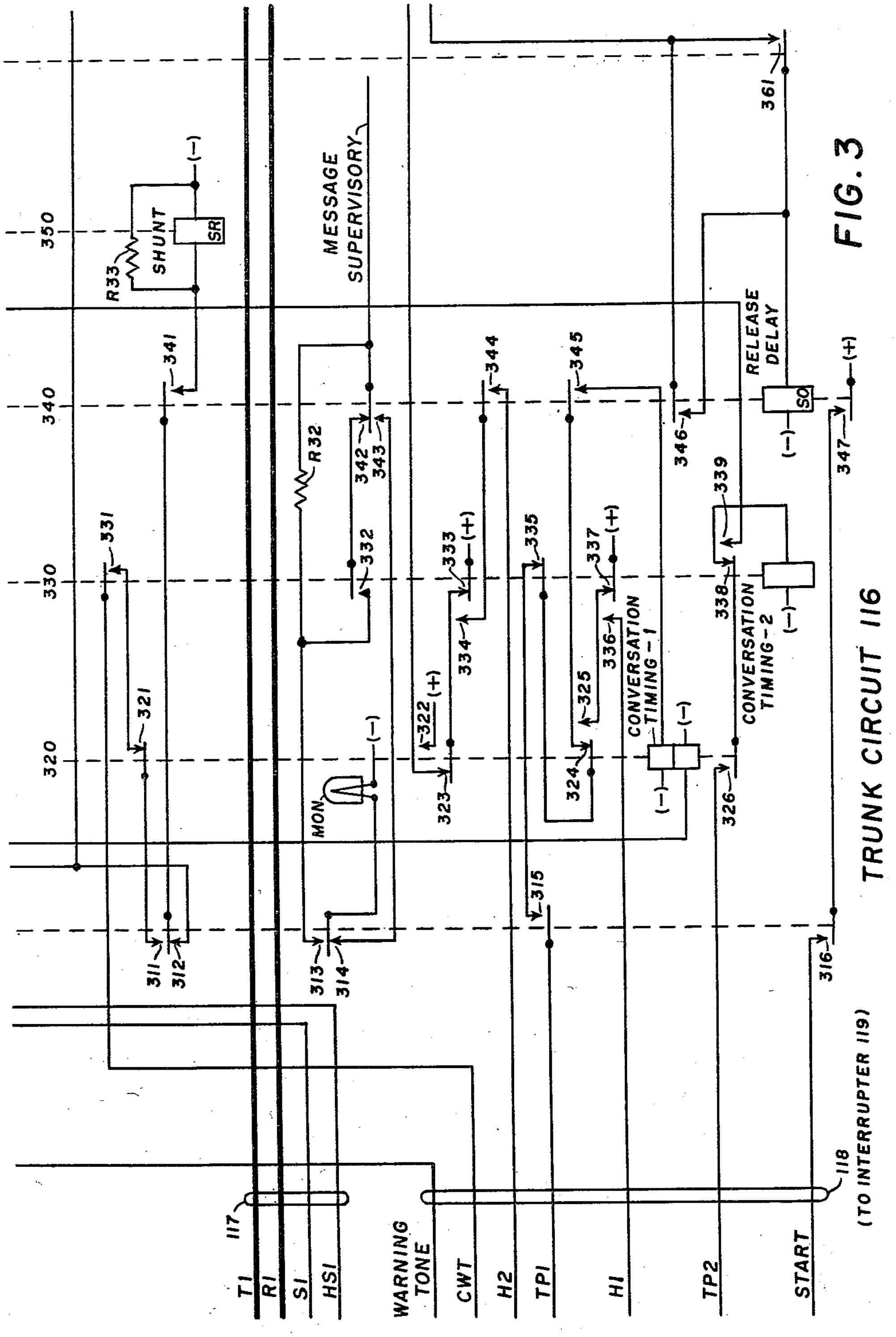
Figures 4, 6:
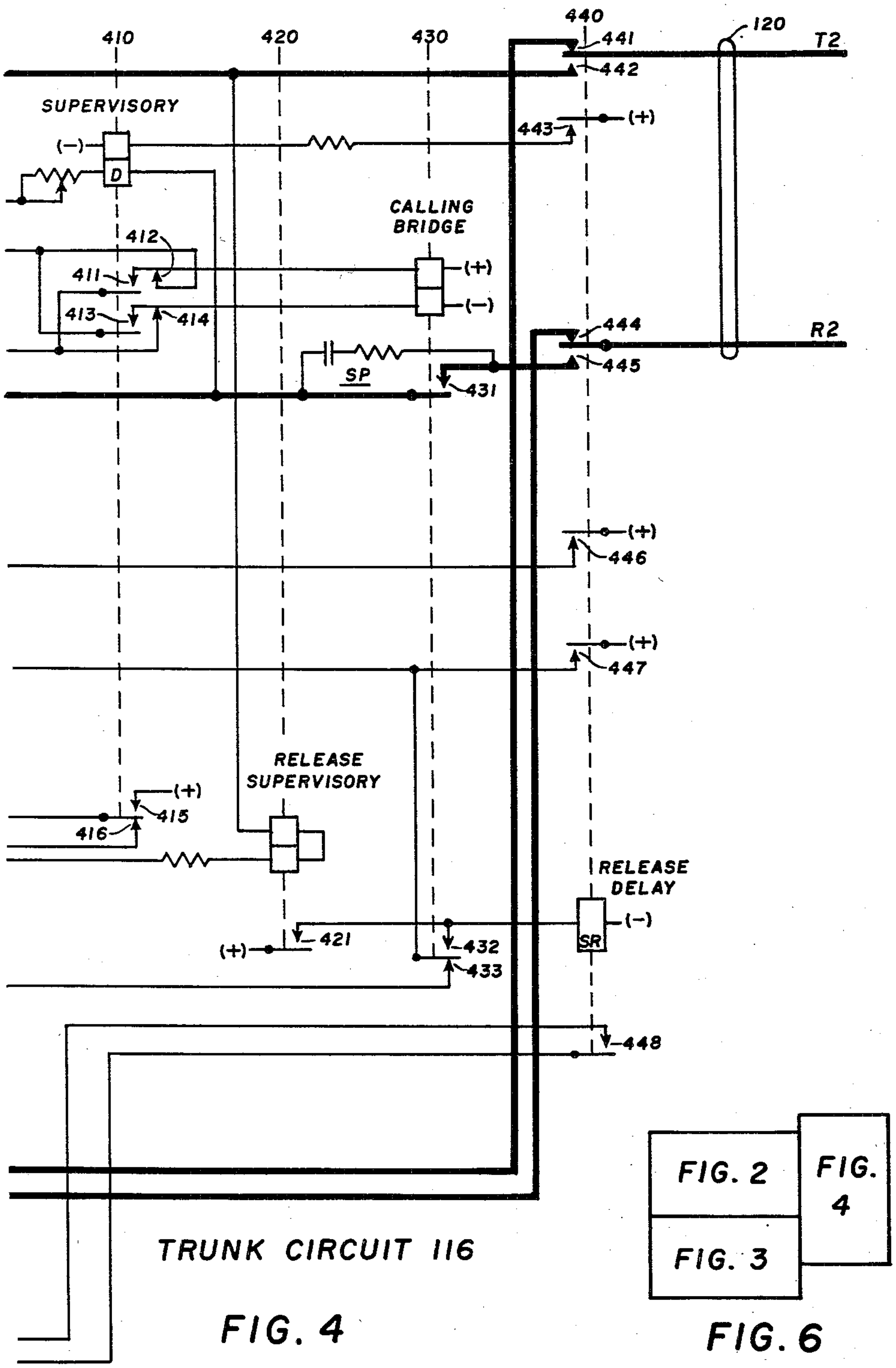

It is thought that the invention will be understood better by making reference to the details of trunk circuit 116 as shown in Figs. 2–4. This trunk circuit is the same as that shown in Fig. 1 by the heavily inked box 116. Conductors 115 extend from the upper left-hand corner of Fig. 2 to the preceding switch such as selector 112, for example. Interrupter 119 is connected to the trunk circuit by way of cabling 118 which is shown in the lower left-hand corner of Fig. 3. Conductor cabling 117, which interconnects two-way trunk circuit 116 and an incoming selector, is shown in the upper left-hand corner of Fig. 3, while the trunk line, 120, to the distant office is shown in the upper right-hand corner of Fig. 4.

*Call from subscriber station A to subscriber station D*

*Seizure.*—It is assumed that the call is extended from subscriber station A to subscriber station D. The trunk circuit of Figs. 2–4 is seized by way of conductors 115 which include tip and ring conductors T and R, sleeve conductor S and extra sleeve conductor HS. Responsive thereto, a loop is completed across talking conductors T and R thereby causing calling bridge relay 430 to operate over the circuit which may be traced from ground (+) through the upper winding of calling bridge relay 430, resting contacts 412, tip conductor T, the preceding switch train, calling subscriber station, conductor R, contacts 414, and the lower winding of calling bridge relay 430 to (−) battery. The purpose of this relay is to receive and respond to digit pulses, to mark the circuit when seized and to control it until released at the end of the call. Contacts 431 close to extend part of the talking circuit. Since these are the pulsing contacts which are used to repeat digit pulses, they are by-passed by a spark protection network SP.

Figures 1, 5:
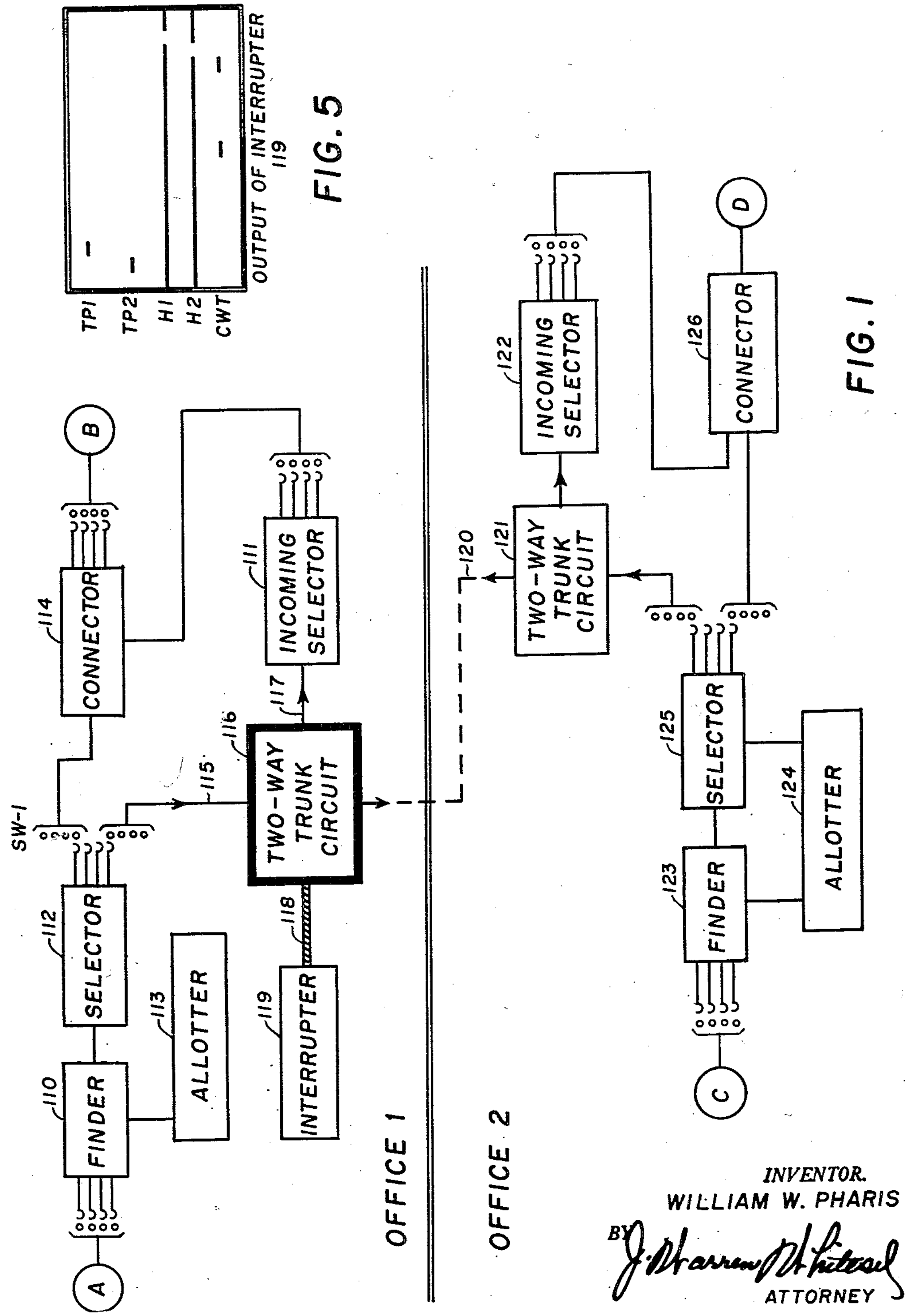

Release delay relay 440 operates over a circuit which may be traced from (−) battery through the winding of release delay relay 440, operated contacts 432 and rest contacts 211 to ground (+). Contacts 442 and 445 close while contacts 441 and 444 open. This disconnects trunk line 120 from its normal connection via conductors 117 to incoming selector 111 (Fig. 1). Furthermore, when contacts 442 and 445 close a loop circuit is completed via conductors 120 from the distant office to operate retard relay 260 over the circuit which may be traced from a battery (not shown) in the distant office normally extended over conductor R2, contacts 445, 431, the lower winding of supervisory relay 410, the winding of retard relay 260 and contacts 442 to conductor T2 and ground (+), not shown, at the distant end. Contacts 443 close to energize the upper winding of supervisory relay 410 to differentially energize the relay so that it will not operate in series with retard relay 260. This loop across tip and ring conductors, T2 and R2, respectively, seizes the incoming selector at the distant end. Contacts 446 close to extend a busy ground marking over conductor S to hold the preceding equipment operated. Release delay relay 440 also completes through contacts 432 a holding circuit for itself at contacts 447. Contacts 448 close to prepare a second release delay relay 340.

Retard relay 260 operates over the loop including trunk line 120. It closes its contacts 261 to complete a circuit for peg count. Peg count is an operation by means of which a traffic survey may be maintained to determine when and the frequency with which trunk circuit 116 is used. The circuit for peg count may be traced from the peg count conductor over operated contacts 261, 243, 236, 213 and a normally closed contact of the busy key to ground (+). It might be noted that contacts 262 open to remove the ground (+) marking normally extended to the all-trunks-busy conductor when trunk circuit 116 is idle. This marking may be traced from ground (+) through a normal contact on the busy key, contacts 213, 236, 243 and 262 to the all-trunks-busy conductor. Each of the trunk circuits corresponding to trunk circuit 116 is provided with a similar set of contacts which connects to the all-trunks-busy conductor. As each trunk circuit becomes busy, it removes one ground (+) marking. When all trunk circuits become busy, the last ground marking is removed thereby releasing a relay which is not shown. That relay connects a meter to a source of pulses which then operates the meter periodically until at least one trunk circuit is idle. In this manner a record is kept of the total elapsed time during which all trunks are busy. Contacts 361 close to complete a circuit to release delay relay 340.

After a brief interval determined by its slow operate characteristics, release delay relay 340 operates via the circuit from (−) battery through the winding of relay 340 and over contacts 361, 448, 323 and 333 to ground (+). Contacts 243 open and thereby terminate the ground (+) marking extended to the peg count conductor. Contacts 241 and 242 close to complete the talking circuit from conductors T and R to conductors T2 and R2. Contacts 341 close to prepare a circuit to shunt relay 350. This relay will be operated when the calling subscriber transmits digit pulses. Contacts 342 open and 343 close to light monitor lamp MON which glows brilliantly as an indication that the trunk circuit has been seized but that the call has not been completed as yet. The circuit for lighting this lamp extends from a ground (+), not shown, on the message supervisory conductor and over contacts 343 and 314 to light monitor lamp MON. Contacts 344 and 345 close to prepare for conversation timing which will be explained later. A circuit is completed at contacts 346 to lock release delay relay 340 in an operated condition. The locking path may be traced from (−) battery through the winding of release delay relay 340, operated contacts 346, 448, 323 and 333 to ground (+). Contacts 347 also close to prepare for conversation timing. This feature will be explained later in the section entitled "Conversation timing."

The circuit is now in condition to receive subscriber transmitted digit pulses and nothing further happens at this time.

*Digit pulsing.*—After a brief interval, digit pulses are transmitted under the influence of a dial located at the station serving subscriber A. Each of these digit pulses is in the form of an open or break in the loop across conductors T and R. Each time that this loop is broken, calling bridge relay 430 releases. Each time that the loop is closed responsive to the termination of a digit pulse, calling bridge relay 430 reoperates. This restoration and reoperation of calling bridge relay 430 is effective to open and close the loop across conductors T2 and R2 which leads to a distant exchange.

More specifically, when calling bridge relay 430 restores to open contacts 431, a switch controlling digit pulse is transmitted over trunk line 120 and through a trunk circuit at the distant office to operate an incoming selector, such as element 122 in Fig. 1, for example. Relay 440 holds throughout pulsing due to its slow release characteristics. Responsive to the restoration of calling bridge relay 430 on the first digit pulse, contacts 433 close to extend a circuit for operating shunt relay 350. This circuit may be traced from (−) battery through the winding of shunt relay 350, operated contacts 341, rest contacts 312, 433 and operated contacts 447 to ground (+).

Shunt relay 350 operates. Each time that calling bridge relay 430 reoperates at the end of a digit pulse, this circuit is broken at contacts 433 and shunt relay 350 begins to deenergize. However, it does not restore due to its slow release characteristics. At the end of the digit pulse train, contacts 433 remain open long enough to allow shunt relay 350 to restore completely. The purpose of this relay is to mark the period during which digit pulses are received and to remove the inductance of retard relay 260 from across conductors T2 and R2 thereby improving the pulsing characteristics over the loop including trunk line 120. More particularly, the inductive effects of retard relay 260 are reduced by a shunt circuit which may be traced from conductor T2 over contacts 442, 234, 254, 431 and 445 to conductor R2. Contacts 251 and 253 open the talking circuit to the distant office during pulsing. Contacts 252 close to complete a shunt via contacts 231 across conductors T and R.

These repeated digit pulses are effective to control equipment which seizes and signals the called subscriber at the distant end and nothing further happens until he responds by removing his receiver.

*Answer supervision.*—When the called subscriber responds by removing his receiver, equipment (not shown) in two-way trunk circuit 121 (Fig. 1) operates to reverse the direction of battery flow across conductors T2 and R2, this is called "reverse battery" supervision. This reverses the direction of current flow through the lower winding of supervisory relay 410, i. e., via conductor T2, contacts 442, the winding of relay 260, the lower winding of relay 410, contacts 431 and 445 to conductor R2. Therefore, relay 410 is no longer differentially energized and it operates. Contacts 411—414 are operated to reverse the direction of battery flow over conductors T and R. That is, before operation of relay 410, the talking battery may be traced from ground (+) through the upper winding of calling bridge relay 430 and over contacts 412 to conductor T, while (—) battery may be traced through the lower winding of calling bridge relay 430 and over contacts 414 to conductor R. After supervisory relay 410 operates, (—) battery may be traced from the lower winding of calling bridge relay 430, over contacts 413 to tip conductor T, while ground (+) may be traced through the upper winding of calling bridge relay 430 and operated contacts 411 to ring conductor R. Contacts 415 close to operate supervisory relay 210 over an obvious circuit.

Relay 210 closes its contacts 212 thereby extending an alternate ground marking to sleeve conductor S for holding preceding equipment operated. Contacts 213 further open the incomplete circuit to the peg count and all-trunks-busy conductors to prevent operation during conversation timing. Contacts 215 close to extend conductor HS to operate conversation timing relay 320 if there is to be no conversation timing during the particular call involved. This feature will be discussed more thoroughly in the section below entitled "Conversation timing." Contacts 216 close to prepare for supervision on release. They have no function at this time. Contacts 311 close further to prepare for transmission of warning tone during conversation timing. Contacts 313 close and 314 open to connect monitor lamp MON to the message supervisory conductor by way of resistor R32. This reduces the voltage applied across monitor lamp MON thereby causing it to glow dimly as an indication that the circuit is switched through for conversation.

*Conversation timing*

This circuit is designed for use in systems where conversation timing is employed selectively on certain calls only. The distinction as to whether conversation timing is or is not to be used depends upon the particular marking forwarded over conductor HS. That is, if there is a ground (+) marking on conductor HS, conversation timing is canceled because relay 320 is held continuously throughout the call, while if there is no marking on conductor HS there is conversation timing. It is assumed that there is no marking so that conversation timing now follows.

It might be recalled that release delay relay 340 and supervisory relay 210 have operated, and that contacts 316 and 347 are now closed to apply a ground (+) marking to the start conductor. This marking is effective for initiating the operation of interrupter 119.

Interrupter 119 is a common device which returns timing pulses and holding markings over the conductors of cable 118 in a manner illustrated in Fig. 5, which shows one-time frame, i. e., at the beginning of any cycle of operation there appears a brief control pulse on conductor TP2 followed by another pulse on conductor TP1. A holding ground (+) marking is applied continuously to conductors H1 and H2 to hold equipment operated until a break occurs in the holding ground near the end of the timing period. Conductor CWT is marked with a pulse twice in each time period. These pulses are used to control the application of warning tone.

Referring now to Fig. 3 in greater detail, if there is no marking on conductor HS the lower winding of #1 conversation timing relay 320 is not energized and the relay is not operated until a pulse first appears on conductor TP1. At this time, ground from the interrupter is applied through contacts 315, 335, 324 and 345 to (—) battery by way of the upper winding of relay 320, which operates. Contacts 321 open to break the incomplete circuit to shunt relay 350 since it is not used in this cycle of the interrupter's operation. Contacts 322 close to hold release delay relay 340 for the duration of this portion of the timing cycle. Contacts 323 open to break the former holding path for this relay which extended to ground (+) at contacts 333. Contacts 324 open and 325 close to lock #1 conversation timing relay 320 operated under the influence of relay 330. This locking path may be traced from (—) battery through the upper winding of relay 320, operated contacts 345, 325 and 337 to ground (+). Contacts 326 close to prepare for the operation of relay 330.

Nothing further happens until the interrupter has gone through a complete cycle of its operation and returned to the starting point at which time a ground (+) pulse appears on conductor TP2 to operate #2 conversation timing relay 330 over the path including contacts 326, 338 and the winding of relay 330 to (—) battery. Relay 330 operates and opens its contacts 231 and 234 while closing contacts 232 and 233 for bypassing contacts 251 and 253 of shunt relay 350. This provides for the application of conversation warning tone later in the interrupter's cycle. Contacts 236 open to prevent any faulty operation of the peg count meter. Contacts 331 close to prepare a circuit for shunt relay 350. Contacts 332 close to prepare for lighting monitor lamp MON brightly. Contacts 333 open and 334 close to prepare a holding circuit for release delay relay 340. Contacts 335 open to break the incomplete connection from conductor TP1 through contacts 315 to the upper winding of #1 conversation timing relay 320 via contacts 324 and 345. From this time on, #1 conversation timing relay 320 is held over the circuit including holding ground conductor H1, contacts 336, 325, 345 and the upper winding of relay 320 to (—) battery. The #2 conversation timing relay 330 locks in an operated condition for the duration of the call over the circuit traced from (—) battery through the winding of relay 330, operated contacts 339 and 446 to ground (+).

The circuit remains in the condition described until the interrupter has gone through another cycle and has broken the ground (+) marking formerly applied to hold conductor H1. It might be noted that #1 conversation timing relay 320 has been locked in an operated condition over its upper winding by way of contacts 345, 325 and 336 to the holding ground on conductor H1. Once this ground is removed by the interrupter, relay 320 restores. Responsive to this restoration, contacts 321 close to prepare a circuit for operating shunt relay 350 when warning tone is to be applied. Contacts 323 close to lock release delay relay 340 to holding conductor H2 via contacts 344, 334, 323, 448, 346 and the winding of relay 340 to (—) battery. Formerly, this relay was locked to the ground applied at contacts 322.

Nothing further happens until the pulse for controlling warning tone is placed on conductor CWT by the common interrupter. At this time a circuit is completed from conductor CWT through contacts 331, 321, 311 and 341 to (—) battery by way of the winding of relay 350, which operates. Contacts 251 and 253 open the talking conductors; however, these are shunted by contacts 232 and 233, respectively, so that conversation may continue. Warning tone is applied at this time over the circuit from the warning tone conductor through capacitor C25, contacts 235 and 254 to the ring conductors and the two subscribers. After a brief interval, the pulse is removed from conductor CWT and shunt relay 350 restores to return the talking conductors to their normal circuit.

This pulse of warning tone has informed the subscribers that their conversation circuit will be broken after another brief interval. When the second pulse appears upon conversation warning tone conductor CWT, shunt relay 350 reoperates and warning tone is placed on the talking conductors once more.

The ground (+) marking is removed from holding conductor H2. This marking has been extended to contacts 344, 334, 323, 448, 346 and the winding or relay 340 to (−) battery; therefore, relay 340 releases at this time. In doing so, it opens its contacts 241 and 242 thereby breaking the talking conductors and terminating conversation.

It might be noted that conversation is terminated; however, the switch train used to set up the call is not released. The calling switch train is held over the circuit through the windings of calling bridge relay 430 while the switches at the called end are held by the circuit extending from conductor R2 through contacts 445, 431, the lower windng of relay 410, the winding of retard relay 260 and contacts 442 to conductor T2. Nothing further happens until each subscriber hangs up, at which time the circuit is released.

If conversation timing is to be canceled, a ground (+) marking is applied to conductor HS. This marking is extended through contacts 215 and the lower winding of #1 conversation timing relay 320 to (−) battery. This circuit holds relay 320 operated despite the fact that ground pulses are applied to or removed from any of the conductors in cable 118. Hence, contacts 322 remain closed for the duration of the call and release delay relay 340 is locked over the circuit which may be traced from (−) battery through the winding of release delay relay 340, contacts 346, 448 and 322 to ground (+). For this reason, contacts 241 and 242 may not thereafter be released to break the talking conductors. Also, contacts 321 remain open to hold the circuit open to the shunt relay 350 so that no warning tone will be applied.

*Release*

When the calling subscriber is the first to establish an on-hook condtion, or stated otherwise, to hang up, he replaces his receiver thereby breaking the loop across conductors T and R to give open loop supervision to restore calling bridge relay 430 to normal. Formerly, this relay held over the circuit which may be traced from ground (+) through the upper winding of calling bridge relay 430, operated contacts 411, ring conductor R, the loop through the calling subscriber station, tip conductor T, operated contacts 413 and the lower winding of calling bridge relay 430 to (−) battery. Contacts 432 open and 433 close. Release supervisory relay 420 is operated over a circuit which may be traced from ground (+) through operated contacts 447, released contacts 433, operated contacts 216, the lower and upper winding of relay 420 in parallel, contacts 442 and conductor T2 to a (−) battery (not shown) in the distant office. Release supervisory relay 420 continues to be locked in an operated condition depending upon the restoration of the called subscriber. Contacts 421 are held operated thereby maintaining the energization of release delay relay 440.

After a brief interval, the called subscriber restores his telephone on-hook thereby extending reverse battery supervision from the distant office to remove (−) battery from conductor T2. This restores release supervisory relay 420 which in turn opens contacts 421. Release delay relay 440 restores. Contacts 446 open to remove ground (+) from sleeve conductor S and from the holding circuit to #2 conversation timing relay 330, if it is then operated. Contacts 448 open to restore release delay relay 340, if it is then operated. Contacts 443 open to restore supervisory relay 410 which in turn opens contacts 415 to restore supervisory relay 210. These various relays all release to remove the locking grounds to any other of the relays which may then be operated, thus restoring them. The last holding ground (+) is removed from sleeve S when relay 210 releases and contacts 212 open. The circuit is now returned to normal and nothing further happens until the next call is routed through this circuit.

If the called subscriber is the first to establish an on-hook condition, the direction of battery flow over conductors T2 and R2 is reversed to extend reverse battery supervision to the trunk circuit. Supervisory relay 410 is differentially energized: therefore, its contacts return to normal. Contacts 415 open to release supervisory relay 210. However, nothing further happens until the calling subscriber hangs up and calling bridge relay 430 restores, following which the circuit is returned to normal.

*Incoming call*

The next call to be described is one which is incoming to trunk circuit 116 from the distant office over trunk line 120. This call may be traced from subscriber station C, over finder 123 (Fig. 1), selector 125, two-way trunk circuit 121, trunk line 120, trunk circuit 116, conductors 117, incoming selector 111 and connector 114 to subscriber B.

Referring next to Figs. 2–4, the incoming call is routed over conductors T2 and R2, contacts 441 and 444 to conductors T1 and R1 of cable 117 which are shown near the upper left-hand corner of Fig. 3. The completion of a loop across these two conductors operates an incoming selector which returns to ground (+) marking over conductor S1 and contacts 416 to operate supervisory relay 210. Contacts 212 close to apply a ground (+) marking to sleeve conductor S, thereby marking the trunk circuit busy to incoming calls. Contacts 213 open to remove ground from the all-trunks-busy conductor. No other relay in the trunk circuit is operated during the incoming call.

*Miscellaneous*

The resistance of the upper, non-inductive winding of relay 210 is provided to furnish a ground (+) marking on conductors HS and HS1 which may be required for differential supervision on outgoing calls and cancellation of conversation timing on incoming calls when required. When supervisory relay 210 operates, this marking is removed in the case of conductor HS and is replaced by a (−) battery marking extended through the lower winding of relay 320 and contacts 215. These markings are of no importance to this circuit but are provided because the preceding equipment occasionally requires it.

While I have shown and described a single embodiment of my invention, it should be obvious that various modifications may be made without departing from the spirit of my invention. Therefore, I intend to include within the scope of the attached claims, all such modifications as may fall within the true spirit of my invention.

What is claimed is:

1. A telephone system including a calling line in a first office, a called line in a second office, a trunk line extending between said offices, a trunk circuit terminating said trunk line, switching means, means including a set of talking conductors for extending a call over said switch train from said calling line through said trunk circuit to said called line, two relays in said trunk circuit, means for connecting one of said relays for furnishing talking battery over said talking conductors to said calling line, the other of said relays comprising a differential relay, means for connecting said other relay to be operated over said talking conductors responsive to reverse battery supervision controlled from said called end, at least one set of contacts interposed in said talking conductors between said connections for operating said two relays for completing the electrical continuity of said talking conductors, means in said trunk circuit for measuring the elapse of a predetermined time period, means responsive to the expiration of said time period for operating said contacts to break said talking conductors and terminate conversation, and means comprising said two relays for thereafter holding at least a portion of said switching means operated until both of said subscribers hang up.

2. A telephone system comprising a plurality of automatic switches, a trunk circuit, a plurality of subscriber lines, talking conductors, means including certain of said switches for extending a call over said talking conductors from a calling one of said subscriber lines in a first office to said trunk circuit, means including other of said switches for extending said call over said talking conductors from said trunk circuit to a called one of said subscriber lines in a second office, said trunk circuit including conversation terminating means interposed in said talking conductors, means in said trunk circuit for measuring the elapse of a predetermined time period, means responsive to said last named means for operating said conversation terminating means to break said talking conductors after the elapse of said predetermined time period, means comprising a first relay connected to said talking conductors on one side of said terminating means to furnish a talking battery to said calling line and to hold said certain switches, and means connected to said talking conductors on the other side of said terminating means comprising a differential relay connected to respond to reverse battery supervision extended under the control of said called line, means including said differential relay for holding said other switches, means responsive to an on-hook condition on said calling line for transmitting open loop supervision to release said first relay, thereby releasing said certain switches, and means responsive to an on-hook condition at said called line for releasing said other switches.

3. A telephone system comprising at least two offices, a trunk line interconnecting said offices, means including a trunk circuit comprised of two talking conductors for terminating said trunk line in one of said offices, means including automatic switch means in each of said offices for extending interoffice calls, means in said trunk circuit for terminating conversation after a timed interval by breaking said talking conductors, means connected to said talking conductors on one side of said breaking means for holding operated the switches in a first of said offices, and means connected to said talking conductors on the other side of said breaking means for holding operated the switches in the other of said offices.

References Cited in the file of this patent

UNITED STATES PATENTS

| | | |
|---|---|---|
| 2,488,797 | Baker | Nov. 22, 1949 |
| 2,595,062 | Elliott | Apr. 29, 1952 |
| 2,702,314 | Pharis | Feb. 15, 1955 |